United States Patent [19]

Zemlin et al.

[11] Patent Number: 5,058,842
[45] Date of Patent: Oct. 22, 1991

[54] LOW TORQUE TILTING PLATFORM

[75] Inventors: Karl E. Zemlin, Greensboro; Ronald G. Sergeant, Lewisville, both of N.C.

[73] Assignee: Burle Technologies, Inc., Wilmington, Del.

[21] Appl. No.: 569,184

[22] Filed: Aug. 17, 1990

[51] Int. Cl.⁵ ............................................ F16M 11/02
[52] U.S. Cl. .................................. 248/178; 248/371; 248/185; 354/293; 352/243
[58] Field of Search ............... 248/178, 185, 371, 923, 248/137, 133, 139, 141; 354/293; 352/243

[56] References Cited

U.S. PATENT DOCUMENTS

| D. 303,120 | 8/1989 | Cavdek | 354/293 |
| 1,243,272 | 10/1917 | Duhem | 352/243 |
| 1,829,142 | 10/1931 | Hyden | 352/243 |
| 2,481,717 | 9/1949 | Blair | 354/293 |
| 3,437,753 | 4/1969 | Stith | 352/243 |
| 4,478,382 | 10/1984 | Carrier | 248/185 |
| 4,655,567 | 4/1987 | Morley | 352/243 |
| 4,720,805 | 1/1988 | Vye | 352/243 |

FOREIGN PATENT DOCUMENTS

| 2457932 | 8/1975 | Fed. Rep. of Germany | 248/178 |
| 1330491 | 9/1973 | United Kingdom | 248/185 |

Primary Examiner—Alvin C. Chin-Shue
Attorney, Agent, or Firm—Martin Fruitman

[57] ABSTRACT

A low torque apparatus for tilting platforms. A leg attached to the platform protrudes from the bottom of the platform to a motor shaft which penetrates one of two vertical sides which form a box-like support structure for the platform. The platform pivots on supports which slide in horizontal slots near the top of each vertical side. The motor is mounted so that it slides in near vertical slots in the vertical sides of the support box to maintain the fixed distance between the motor shaft and the tilting platform.

8 Claims, 3 Drawing Sheets

LOW TORQUE TILTING PLATFORM

SUMMARY OF THE INVENTION

This invention deals generally with an apparatus for tilting a platform and more specifically with a low torque drive system for tilting a platform upon which a load such as a TV or movie camera can be located in order to vary the vertical direction of the field of view of the camera.

Although there are a multitude of platform tilting systems which are used to support and control the vertical aim of TV and movie cameras, they all require high torque drives. For instance, the most common system, used not only for camera platforms but also for many other tilt systems such as artillery weapons, is a simple ring gear which is oriented in a vertical plane and driven by a mating gear, with the ring gear driving a pivoted platform upon which the load is located. However, in such a system the motor must produce sufficient torque to both rotate and lift the weight of the entire platform, including the load on the platform, all of which is located on a radius remote from the pivot point of the system. Such systems require high torque drives to overcome the force of gravity on the weight of the platform and its load.

The present invention also furnishes a tilting platform, but drives the tilting motion of the platform with a light duty motor which is required to produce only a fraction of the torque required for a conventional platform tilting apparatus. This is accomplished by the use of a unique configuration of the platform and the drive motor, which permits both the platform and the motor to move during the tilting action, and by locating the platform pivot point close to the platform center of gravity. The connection between the motor and the platform is a leg attached to the bottom of the platform with that leg interconnecting the platform to the motor shaft.

The platform is supported by a box like structure which has a bottom plate, a front plate, and two vertical side plates. The platform itself rests upon two supports which fit into horizontal slots near the top of the two vertical side plates. Two other supports which fit into and move within near vertical slots in the vertical side plates are attached to two legs which are attached to the bottom of the platform. It is one of these legs which is attached to the motor shaft to power the platform's tilting motion.

The motor itself is mounted on a support plate which is supported by two or more supports that are also captured and slide within near vertical slots within one of the vertical side plates. This configuration permits the platform to slide in horizontal slots so that the motor is not required to lift the full weight of the platform and its load against the force of gravity, as it would with a curved slot. Meanwhile, the near vertical slots within which the motor support plate moves maintain the fixed spacing required between the motor shaft and the platform, even though the platform is not traveling in a fixed circular path around the motor shaft.

In effect the motor is required to lift its own weight rather than lift the weight of the entire platform, including the load on the platform.

Another benefit of the present invention is the compact configuration. While most tilt systems require a size large enough to account for the entire platform traveling in a large radius circular path, the present invention uses a relatively short radius path which closely approximates simply rotating the platform on its center of gravity.

This provides a unique system which eliminates the need for worm gears, spur gears, chain drives, or other power transmission devices between the motor and the platform, and for TV and motion picture cameras, it maintains the popular "over-the-top" configuration while minimizing the overall size of the assembly.

DETAILED DESCRIPTION OF THE INVENTION

Figure 1:
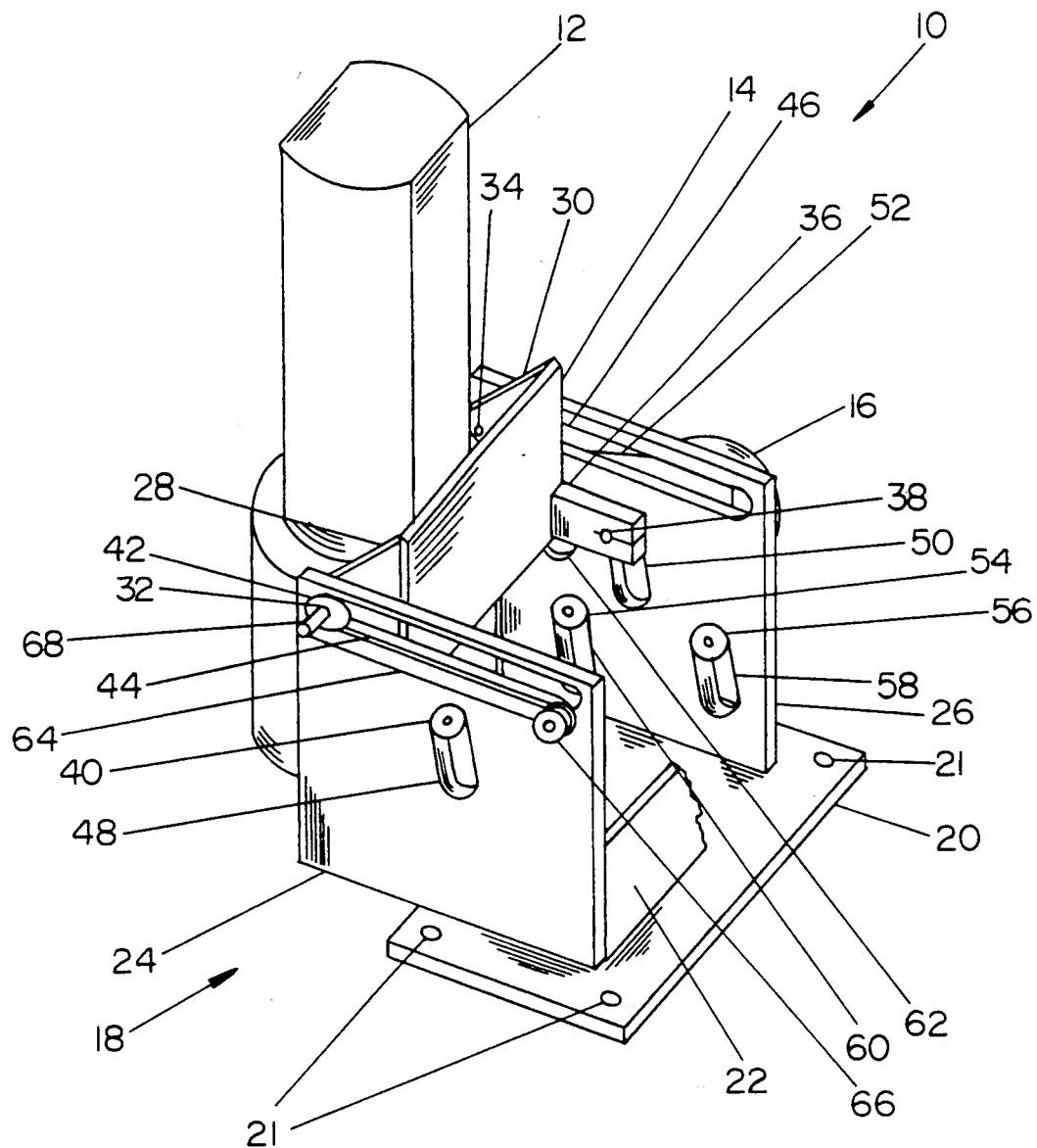
FIG. 1 is a perspective view of the preferred embodiment of the invention, showing the location of the various slots in the vertical side plates and with the platform oriented in a vertical plane.

FIG. 1 is a perspective view of the preferred embodiment of platform tilting apparatus 10 showing a TV camera 12 as a load located upon platform 14, and motor 16 which powers the tilting action.

Platform 14 and motor 16 are mounted on support structure 18 which is a box-like configuration constructed upon base plate 20, which includes mounting holes 21 to attach it to a stable support (not shown). Base plate 20 has attached to it front plate 22, shown partially cut away, and two vertical side plates 24 and 26. Front plate 22 interconnects and stabilizes vertical side plates 24 and 26.

Platform 14 is built with an underslung configuration, with hangers 28 and 30, which include pivot connections 32 and 34, dimensioned so that the pivot point is located adjacent to or very close to the combined center of gravity of the platform and the load, which in the preferred embodiment is TV camera 12. The distance between pivot connections 32 and 34 and platform 14 should be selected for each individual platform load so that pivot connections 32 and 34 are as close as practical to the center of gravity of platform 14 and its load. Such a construction minimizes the load torque on motor 16, because the tilting motion closely simulates rotating platform 14 and load 12 as opposed to lifting them against the force of gravity.

Motor 16 is coupled to platform 14 by leg 36 which is interconnected between motor shaft 38 and the bottom of platform 14. Another optional leg, which corresponds to leg 36, can be attached to the other (near) side of platform 14 and attached to support 40, but it can not be seen in FIG. 1 because it is behind vertical side plate 24.

Platform 14 is mounted on support structure 18 by means of supports 42 which are attached to pivot connections 32 and 34 and fitted into slots 44 and 46 which are located near the top of vertical side plates 24 and 26, respectively. Additional support points are at the remote ends of legs 36, at support 40 in slot 48 in vertical side plate 24, and at another optional support (not seen) on motor shaft 38 in slot 50 in vertical side plate 26.

Motor 16 is similarly mounted onto support structure 18 by mounting it on support plate 52 which, in turn, is held onto vertical side plate 26 by supports 54 and 56 mounted in slots 58 and 60 and by another support (not seen) in slot 62.

Figure 2:
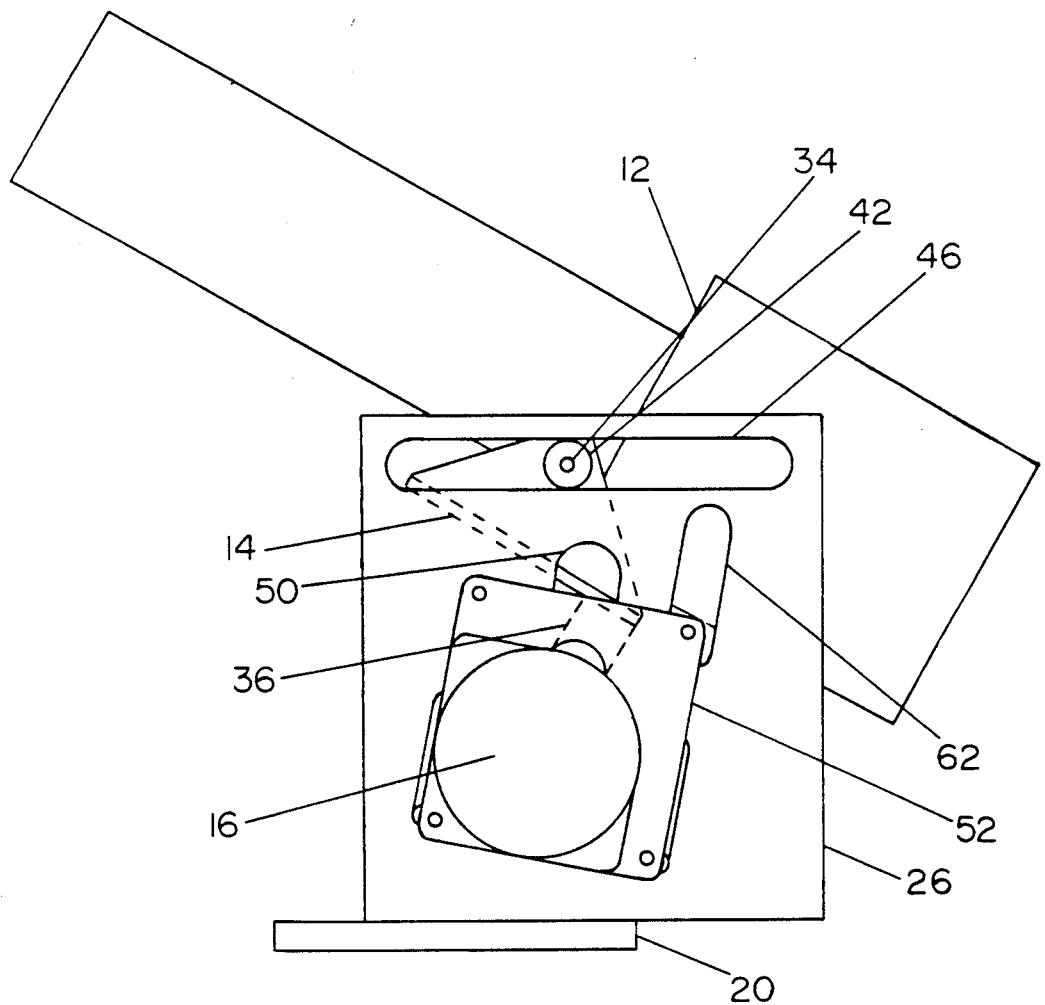
FIG. 2 is a view of the preferred embodiment of the invention with the platform oriented approximately 30 degrees below the horizontal plane.
Figure 3:
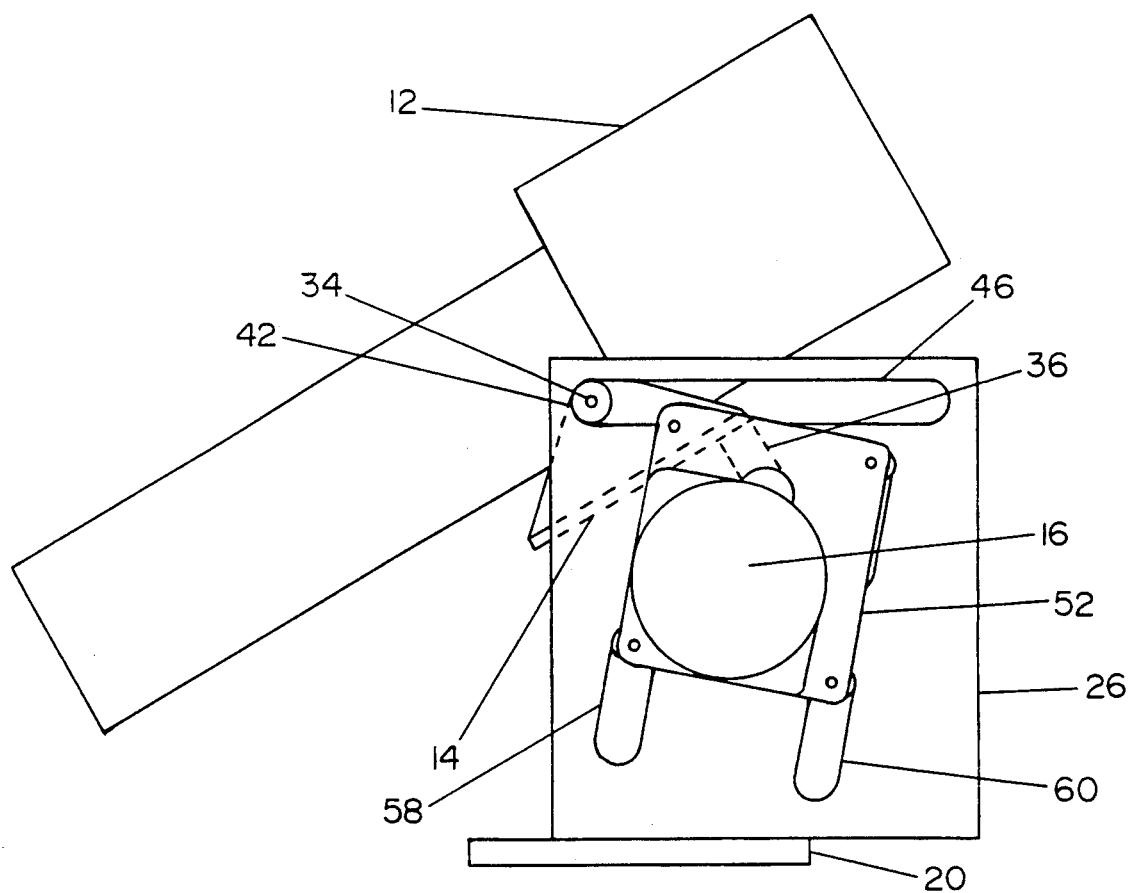
FIG. 3 is a side view of the preferred embodiment of the invention with the platform oriented approximately 30 degrees above the horizontal plane.

The tilting action of platform tilting apparatus 10 can best be appreciated by noting the differences between the positions of platform 14, camera 12, leg 36 and motor 16 in FIGS. 1, 2 and 3, which show motor shaft 38 and connecting leg 36 rotated approximately 120 degrees.

As seen in FIG. 1, leg 36, which is connected to motor shaft 38, is horizontal when platform 14 is in a vertical plane. With platform 14 in that position, motor support plate 52 is located at the top of slots 50, 58, 60 and 62 within which it is retained by several supports, including supports 54 and 56. As seen in FIG. 1, leg 36 would rotate in the clockwise direction to change the position of platform 14 from the vertical orientation in which it is shown.

This vertical position of platform 14 is one extreme of its motion since, whether the load is a camera or an artillery cannon, any desired position beyond straight up can more easily be attained by rotating the device in the horizontal plane rather than by attempting to turn the device upside down. Actually, the tilting platform apparatus of the invention is almost always used along with a horizontal rotating mechanism to which base plate 20 is attached. In camera art the horizontal rotating mechanism is called a "pan" system, so that in combination with the present invention it would be a pan and tilt system.

FIG. 2, which is a view from the back side of the view seen in FIG. 1, shows leg 36 and platform 14 rotated approximately 60 degrees from their positions in FIG. 1. Therefore, they have been rotated clockwise in FIG. 1 and counterclockwise in FIG. 2 from their positions in FIG. 1. The result is that in FIG. 2 camera 12 and platform 14 are positioned approximately 30 degrees below the horizontal plane.

FIG. 2 demonstrates the function of the several slots in vertical side plate 26 within which motor support plate 52 and motor 16 move. As leg 36 rotates, support 42 and pivot connection 34 move along horizontal slot 46, but since slot 46 is not a circular path, and the radius of rotation, that is, the distance between motor shaft 38 (seen in FIG. 1) and pivot connection 34, is fixed, motor shaft 38 itself is permitted to move. FIG. 2 shows motor 16 near its lowest point within the slots. This occurs when pivot connector 34 is located almost directly above motor shaft 38.

FIG. 3 shows the second extreme of the motion of platform 14 and its load, camera 12. In FIG. 3, the rotation of leg 36 and platform 14 has continued approximately 60 degrees beyond the rotation shown in FIG. 2, so that the rotation is approximately 120 degrees from that shown in FIG. 1, and platform 14 and camera 12 are in planes 30 degrees above the horizontal plane. In this configuration, motor 16 has again been raised within the slots in vertical side plate 26, and it is located in essentially the same position as it is in FIG. 1, except motor shaft 38 has been rotated approximately 120 degrees.

The extremes of motion shown are not actual limits of the invention, but are all that is required in most applications. If desired, the rotation shown for platform 14 could be extended, even enough to provide a full 180 degree rotation. One advantage of the configuration of the present invention is that with, as in FIG. 1, camera 12 aimed straight downward, its view is not obstructed by its support structure. Similarly, a long load can tilt the entire 180 degrees and not interfere with its support structure.

Referring again to FIG. 1, another feature of the invention can be seen in spring 64. Spring 64 is attached to shaft 68 near pivot connector 32 and is designed to roll up onto reel 66 under its own tension. Spring 64 functions to prevent backlash in the motion of platform 14.

The benefits of the present invention are that not only does the platform reference pivot point stay in one horizontal plane during its full travel, where it can simplify aiming and computer control, but that, as the platform traverses its entire path, the motor is only required to lift its own very small weight rather than the considerably greater weight of the platform and load, which would be required if the platform were moving conventionally on a circular path in a vertical plane. This unique configuration permits the present invention to perform the same task with a much smaller motor than has been used in the prior art, and thereby reduces both initial and operating costs.

It is to be understood that the form of this invention as shown is merely a preferred embodiment. Various changes may be in the function and arrangement of parts; equivalent means may be substituted for those illustrated and described; and certain features may be used independently from others without departing from the spirit and scope of the invention as defined in the following claims.

For example, loads other than cameras could be used upon platform 14, and there could be more or fewer slots within which motor 16 moves. Moreover, those slots could be either exactly vertical or deviate from the vertical to a greater or lesser degree. Furthermore, supports such as 40, 42, 54 and 56 could be constructed as rollers to reduce friction, and support plate 52 could be integrated into motor 16 or into a motor auxiliary, such as a gearbox.

What is claimed as new and for which Letters patent of the United States are desired to be secured is:

1. A tilting platform apparatus comprising:
   a base plate;
   a first vertical side plate attached to the base plate and extending transversely from the base plate, the first vertical side plate including at least one essentially horizontal slot;
   a second vertical side plate, parallel to the first vertical side plate, attached to the base plate and extending from the base plate in the same direction as the first vertical side plate, the second vertical side plate including at least one essentially horizontal slot and a first essentially vertical slot;
   a tilting platform to which are attached two hangers extending transverse to the platform, with each hanger attached to a pivot connection at a location a distance from the platform, and each pivot connection being attached to a pivot support, the platform being located between the first and second vertical side plates and being pivotably and slideably attached to the two vertical side plates at the pivot connections by the pivot supports being located within the essentially horizontal slots within the two vertical side plates;
   a first leg attached to the platform and extending transversely from the platform in a direction opposite from the direction of the hangers;

a motor, with a shaft, slideably attached to the second vertical side plate so that the motor may move in an essentially vertical direction, with the shaft of the motor attached to the first leg of the platform, thus permitting the motor shaft to rotate the first leg and the platform around the motor shaft.

2. The tilting platform apparatus of claim 1 further including an additional vertical plate interconnecting and stabilizing the two vertical side plates.

3. The tilting platform apparatus of claim 1 further including a motor support plate upon which the motor is mounted and at least one additional essentially vertical slot in the second vertical side plate within which a support attached to the motor support plate is located to provide the slideable attachment of the motor to the second vertical side plate.

4. The tilting platform apparatus of claim 1 further including a second essentially vertical slot in the first vertical side plate located opposite from the first essentially vertical slot within the second vertical side plate and a second leg attached to the platform and extending transversely from the platform in a direction opposite from the direction of the hangers, the second leg being located near the side of the platform nearest to the first vertical side plate, with a second leg support attached to a point on the second leg remote from the platform, the point being opposite the location of the motor shaft, and with the second leg support being located within the second essentially vertical slot in the first vertical side plate.

5. The tilting platform apparatus of claim 1 further including a load located upon the platform.

6. The tilting platform apparatus of claim 1 further including a camera located upon the platform.

7. The tilting platform apparatus of claim 1 wherein the distance between the platform and the pivot connections of the hangers is selected so that the center of gravity of the platform and a load on the platform is adjacent to the pivot connections.

8. The tilting platform apparatus of claim 1 further including a spring means to reduce the backlash of the platform.

* * * * *